(12) United States Patent
Kotteri et al.

(10) Patent No.: US 11,100,808 B2
(45) Date of Patent: Aug. 24, 2021

(54) SYSTEM AND METHOD FOR VEHICLE CONVOYS

(71) Applicant: JAGUAR LAND ROVER LIMITED, Warwickshire (GB)

(72) Inventors: Jithesh Kotteri, Coventry (GB); Krishna Jayaprakash, Coventry (GB); Neenu Issac, Coventry (GB); Jithin Jayaraj, Coventry (GB); Bineesh Ravi, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 298 days.

(21) Appl. No.: 16/122,937

(22) Filed: Sep. 6, 2018

(65) Prior Publication Data
US 2019/0088142 A1 Mar. 21, 2019

(30) Foreign Application Priority Data
Sep. 18, 2017 (GB) .................................... 1714972

(51) Int. Cl.
*B60W 30/165* (2020.01)
*G08G 1/00* (2006.01)
*G05D 1/02* (2020.01)

(52) U.S. Cl.
CPC ............ *G08G 1/22* (2013.01); *B60W 30/165* (2013.01); *G05D 1/0253* (2013.01); *G05D 1/0293* (2013.01); *G05D 2201/0213* (2013.01)

(58) Field of Classification Search
CPC .... G01C 21/30; G01C 21/32; G01C 21/3407; G08G 1/22; G05D 1/0253; G05D 1/0293;
(Continued)

(56) References Cited

U.S. PATENT DOCUMENTS 5,904,727 A * 5/1999 Prabhakaran .......... G08G 1/127
701/454
2017/0091923 A1* 3/2017 Siercks ................ H04N 5/2252
(Continued)

FOREIGN PATENT DOCUMENTS

DE 10 2013 007716 A1 11/2014
DE 102018215344 A1 * 3/2019 ............... G08G 1/22
(Continued)

OTHER PUBLICATIONS

Fuel-saving potentials of platooning evaluated through sparse heavy-duty vehicle position data; Kuo-Yun Liang ; Jonas Mårtensson ; Karl H. Johansson; 2014 IEEE Intelligent Vehicles Symposium Proceedings, IEEE Conference Paper, (Year: 2014).*
Simultaneous localization and mapping based on particle filter for sparse environment; Jian-Hua Chen ; Kai-Yew Lum; 2014 International Conference on Mechatronics and Control (ICMC); IEEE Conference Paper. (Year: 2014).*
(Continued)

*Primary Examiner* — Cuong H Nguyen
(74) *Attorney, Agent, or Firm* — Carlson, Gaskey & Olds

(57) ABSTRACT

Embodiments of the present invention provide systems and methods for use in a non-lead vehicle in a convoy, particularly an off-road convoy. The system comprises an image handling module adapted to obtain non-lead image data of the scene in the vicinity of the non-lead vehicle; a communications module adapted to receive data from a preceding vehicle in the convoy, the data comprising at least lead image data of the scene in the vicinity of the preceding vehicle; a processing module adapted to: obtain pose data of the preceding vehicle and a sparse map, both derived from the lead image data, wherein the sparse map comprises coordinates of a set of identifying features in the scene, and derive pose data of the non-lead vehicle relative to the preceding vehicle from the non-lead image data and the sparse map via visual odometry.

19 Claims, 8 Drawing Sheets

(58) Field of Classification Search
CPC ........ G05D 2201/0213; B60W 30/165; G06K 9/00791
USPC ...... 701/23, 400, 117, 454; 340/990, 995.23
See application file for complete search history.

(56) References Cited

U.S. PATENT DOCUMENTS

2017/0336794 A1* 11/2017 Shashua ............... G05D 1/0246
2018/0336697 A1* 11/2018 Lu ........................... G01S 17/89

FOREIGN PATENT DOCUMENTS

| GB | 2545571 A | | 6/2017 | |
|---|---|---|---|---|
| GB | 201714972 | * | 11/2017 | ............... G08G 1/22 |
| GB | 2566523 A | * | 3/2019 | ........... B60W 30/165 |
| GB | 2566523 B | * | 2/2020 | ........... B60W 30/165 |
| WO | 2015/047174 A1 | | 4/2015 | |

OTHER PUBLICATIONS

Continuous vehicle localisation using sparse 3D sensing, kernelised rényi distance and fast Gauss transforms; Mark Sheehan ; Alastair Harrison ; Paul Newman; 2013 IEEE/RSJ International Conference on Intelligent Robots and Systems (Year: 2013).*

Monocular localization within sparse voxel maps; David Wong ; Yasutomo Kawanishi ; Daisuke Deguchi ; Ichiro Ide ; Hiroshi Murase; 2017 IEEE Intelligent Vehicles Symposium (IV) (Year: 2017).*

Vehicle detection by means of stereo vision-based obstacles features extraction and monocular pattern analysis; G. Toulminet;M. Bertozzi;S. MoussetjA. Bensrhair;A. Broggi; IEEE Transactions on Image Processing; vol. 15, Issue: 8; IEEE Journal Article; (Year: 2006).*

Combined Search and Examination Report under Sections 17 and 18(3) for Application No. GB1714972.5 dated Feb. 27, 2018.

* cited by examiner

SYSTEM AND METHOD FOR VEHICLE CONVOYS

CROSS REFERENCE TO RELATED APPLICATIONS

This application claims priority to United Kingdom Patent Application No. GB 1714972.5, filed on 18 Sep. 2017.

TECHNICAL FIELD

The present disclosure relates to a system and method for vehicle convoys and particularly, but not exclusively, to off-road convoys. Aspects of the invention relate to a system suitable for use in a non-lead vehicle in a convoy, to a method of vehicle communication in a convoy, and to a vehicle.

BACKGROUND

Off-roading is an activity involving driving or riding a vehicle on unsurfaced roads or tracks. In certain situations, off-roading vehicles may proceed in group or convoy. However, the front vehicle may obstruct the view of the users of one or more following vehicles. This can be dangerous as the driver of the following vehicle not be aware of approaching obstacles or changes in the terrain. In this way, the driver may not take appropriate action to avoid or overcome the obstacle or to adjust the vehicle settings to negotiate the terrain in a safe and appropriate manner. The visual information around the off-roading vehicle can be important for the driver to make proper decisions and to navigate the vehicle through tough terrains.

In many off-road scenarios, there may not be much information available, for example the route may not be marked on maps. Furthermore, the off-roading location may be outside of GPS coverage. Additionally, the off-roading location may have little infrastructure in place, including communications infrastructure such that there may be no available voice or data mobile coverage. As such, many standard navigation and communication technologies available to drivers in an "on-road" situation may not be available off-road. Therefore, there is a difficulty in sharing information such as vehicle locations and routing between vehicles in the convoy.

It is an object of embodiments of the invention to at least mitigate one or more of the problems of the prior art.

SUMMARY OF THE INVENTION

Aspects and embodiments of the invention provide a system, a method, and a vehicle as claimed in the appended claims.

According to an aspect of the invention, there is provided a system suitable for use in a non-lead vehicle of a convoy, the system comprising an image handling module adapted to obtain non-lead image data representative of a first scene in the vicinity of the non-lead vehicle; a communications module adapted to receive data from a preceding vehicle in the convoy, the data comprising at least lead image data representative of a second scene in the vicinity of the preceding vehicle; a processing module adapted to: obtain pose data of the preceding vehicle and a sparse map of the second scene, the pose data and the sparse map being derived from the lead image data, wherein the sparse map comprises coordinates of a set of identifying features in the second scene, and derive pose data of the non-lead vehicle relative to the preceding vehicle from the non-lead image data and the sparse map. Optionally, the pose data may be derived via visual odometry. Advantageously, in this way the non-lead vehicle may know its position relative to the lead vehicle, without the need for either vehicle to use a GPS equipment or other infrastructure external to the system.

According to one aspect of the invention, there is provided a system as described above wherein said image handling module comprises an electronic processor in electrical communication with electronic memory for storing image data, the electronic processor having an electrical input for receiving electrical signals indicative of image data of the first scene in the vicinity of the non-lead vehicle; said communications module comprises an electrical processor having electrical inputs and outputs for receiving and sending electrical signals indicative of image data of the second scene in the vicinity of the preceding vehicle; and said processing module comprising an electronic processor electrically coupled to electronic memory storing instructions, wherein the processor is configured to access the instructions stored on the memory such that it is operable to obtain pose data of the preceding vehicle and a sparse map of the second scene, the pose data and the sparse map being derived from the lead image data, wherein the sparse map comprises coordinates of a set of identifying features in the scene, and derive pose data of the non-lead vehicle relative to the preceding vehicle from the non-lead image data and the sparse map. The pose data may be derived via visual odometry. It will be understood that the electronic processors of the processor module, communications module and image handling module may be implemented by a single electronic processor and a single accompanying memory device storing instructions which on execution allow the processor to perform the functions specified above.

The convoy may be an off-road convoy.

In an embodiment, the communications module is adapted to transmit the pose data of the non-lead vehicle to another vehicle in the convoy. Optionally, the communications module broadcasts the pose data. The communications module may use vehicle-to-vehicle (V2V) technology. In this way, the position of the non-lead vehicle may be shared with other vehicles in the convoy, including the lead vehicle.

In an embodiment, the sparse map includes a representation of visual information surrounding each coordinate. Including visual information in this manner provides for increased accuracy in the derived relative pose data.

Optionally, the coordinates of the sparse map are 3D world points.

The pose data may comprise position data and orientation data for the vehicle with respect to the environment. This is a particularly convenient way to facilitate identifying the relative position of the vehicles in the convoy.

In an embodiment, the processing module may be adapted to obtain the sparse map from the preceding vehicle, via the communications module. The processing module may be adapted to obtain both the pose data of the preceding vehicle and the sparse map from the preceding vehicle, via the communications module. Alternatively, the processing module may be adapted to derive the pose data of the preceding vehicle and the sparse map from the lead image data. In this way, the processing burden of deriving the sparse map may be located in either the lead vehicle or non-lead vehicle The sparse map may derived in the process of deriving the pose data of the preceding vehicle.

Optionally, the system comprises a display. The display may be a high level display function for use in a vehicle infotainment system.

The processing module may be adapted to generate a terrain representation of the terrain traversed by the preceding vehicle from successive frames of lead image data in combination with the preceding vehicle pose data associated with each frame of lead image data. In this way, a user inside the vehicle may visualize the surrounding environment including the area beneath the vehicle, in HLDF display. A vehicle in convoy can view the region occluded by a leading vehicle, as if that leading vehicle were transparent.

In an embodiment, the display is adapted to display the terrain representation from the point of view of the non-lead vehicle. Advantageously, this allows the information to be displayed in a user-friendly manner.

Optionally, the communication module is adapted to receive relative pose data from other vehicles in the convoy. In this way, the vehicle may be aware of the relative location of the other vehicles in the convoy.

The display may be adapted to display an indication of a further vehicle according to the received pose data in the terrain representation. In an embodiment, the indication of the further vehicle is such that the further vehicle appears at least partially transparent. In this way, the presence of the further vehicle may be indicated in the representation but without significantly obstructing the view of the terrain. Alternatively, no indication of the vehicle may be displayed.

Optionally, the image handling module is adapted to receive the non-lead image data from a camera mounted on the non-lead vehicle so as to capture the non-lead image data. Alternatively, the image handling module comprises a camera adapted to be mounted on the non-lead vehicle so as to capture the non-lead image data. In this way, it is possible to include a camera in the system if necessary, or if an external camera is available, the system may be connected thereto.

The camera may be a stereo camera. The communications module may be adapted to receive stereo camera originating data. In this way, the relative pose data may be calculated with high accuracy and the 3D information may be used to provide for 3D reconstruction of the surroundings. Optionally, the stereo camera originating data may comprise left and right images from a stereo camera and their associated disparity image. Should the data not comprise a disparity image, the image handling module can calculate one from the left and right images.

In an embodiment, the terrain representation is generated from a 3D point cloud derived from the lead image data. This is a convenient and computationally efficient manner of preparing a 3D representation.

Optionally, the camera is a colour camera. The communications module may be adapted to receive colour camera originating data. The lead image data may be colour image data. Colour image data is useful to for providing an informative view of the terrain to the user.

According to another aspect of the invention, there is provided a system suitable for use in a lead vehicle in a convoy, the system comprising a camera adapted to be mounted on the lead vehicle so as to capture lead image data of the scene in the vicinity of the lead vehicle; a processing module adapted to: derive pose data of the lead vehicle from the lead image data via visual odometry, generate a sparse map derived from lead image data wherein the sparse map comprises coordinates of a set of identifying features in the scene, and a communications module adapted to transmit data to a trailing vehicle in the convoy, the data comprising one or more of pose data for the lead vehicle, the sparse map and lead image data of the scene in the vicinity of the lead vehicle.

According to yet another aspect of the invention, there is provided a vehicle including the systems as described herein.

According to a further aspect of the invention, there is provided a method of vehicle communication in a convoy, comprising capturing non-lead image data representative of a first scene in the vicinity of the non-lead vehicle; receiving data from a preceding vehicle in the convoy, the data comprising at least lead image data of a second scene in the vicinity of the preceding vehicle; obtaining pose data of the preceding vehicle and a sparse map of the second scene, the pose data and the sparse map being derived from the lead image data, wherein the sparse map comprises coordinates of a set of identifying features in the second scene; and deriving pose data of the non-lead vehicle relative to the preceding vehicle from the non-lead image data and the sparse map via visual odometry. Advantageously, the method allows a non-lead vehicle in a convoy to find its position relative to the lead vehicle.

In an embodiment, the method comprises transmitting the pose data of the non-lead vehicle to another vehicle in the convoy. Optionally, method comprises broadcasting the pose data. The method may comprise using vehicle-to-vehicle (V2V) technology to communicate with other vehicles in the convoy. In this way, all vehicles in the convoy may be made aware of the relative position information.

In an embodiment, the method comprises obtaining the sparse map from the preceding vehicle, via the communications module. Alternatively, the method may comprise deriving the sparse map from the lead image data. In this way, the computational burden of the derivation of the sparse map may be located at the most suitable vehicle.

The method may comprise deriving the sparse map as a result of deriving the pose data of the preceding vehicle.

Optionally, the method comprises generating a terrain representation of the terrain traversed by the preceding vehicle from successive frames of lead image data in combination with the preceding vehicle pose data associated with each frame of lead image data. Advantageously, this allows other vehicles to view the scene in the vicinity without other vehicles obstructing the view, and may also allow other vehicles to view the route taken by the lead vehicle.

The method may comprise displaying the terrain representation from the point of view of the non-lead vehicle. This allow the user to interpret the displayed information in an intuitive manner.

In an embodiment, the method comprises receiving relative pose data of a further vehicle in the convoy from the further vehicle. In this way, the representation may include the location of all vehicles in the convoy.

Optionally, the method comprises displaying an indication of a further vehicle according to the received pose data in the terrain representation. The method may comprise displaying an indication of the further vehicle such that the further vehicle appears at least partially transparent. In this way, the pose of the further vehicle may be displayed without obstructing the user's view of the terrain.

In an embodiment, the method comprises wherein capturing non-lead image data of the scene in the vicinity of the non-lead vehicle comprises capturing stereo image data. The method may comprise receiving stereo camera originating data as lead image data. The use of stereo data provides for improved accuracy in pose date calculation and for creating a 3D representation for display.

Optionally, the method comprises deriving a 3D point cloud from the lead image data and generating the terrain representation from the 3D point cloud.

In an embodiment, the method comprises providing error correction of the visual odometry pose data using vehicle odometry. In this way, inaccuracies introduced over time in the visual odometry calculations may be reduced.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
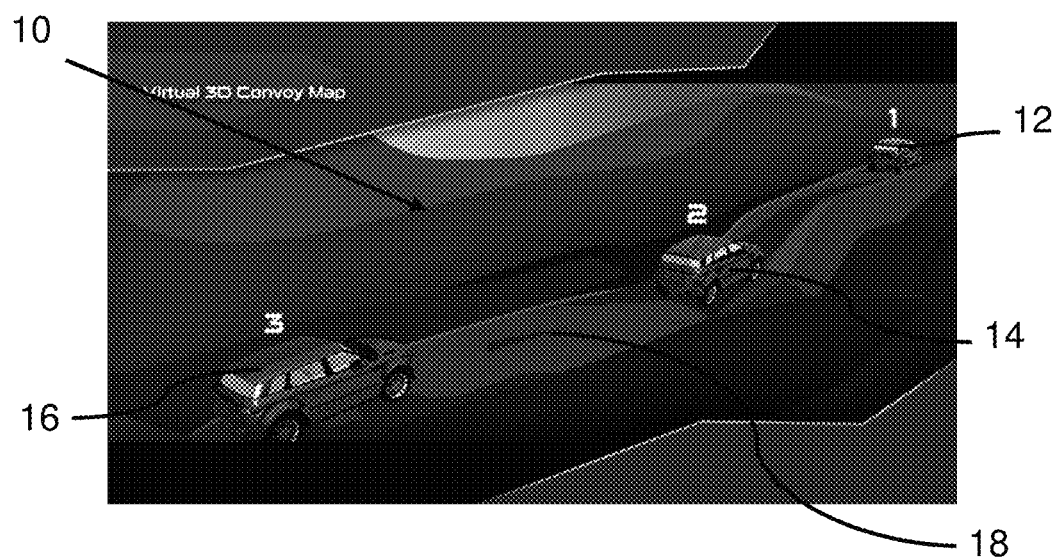
FIG. 1 shows an off-road convoy in which embodiments of the invention may operate.

Referring initially to FIG. 1, there is shown an off-road convoy of vehicles, indicated generally by the reference numeral 10. The convoy 10 comprises three vehicles 12, 14, 16 travelling an off-road track 18. An off-road route or track may typically be lacking in built landmarks including signage and road markings, and infrastructure including communications infrastructure. In this way, many driver or vehicle assistance technologies such as GPS and the like may have limited availability in such an environment. A convoy of vehicles may be understood to refer to a group of vehicles travelling along a broadly similar route. A convoy comprises a plurality of vehicles and is not limited to the three vehicle example convoy shown in FIG. 1.

The first vehicle 12 is the first vehicle in the convoy 10, is marked as vehicle 1 and may also be referred to as vehicle A, the lead vehicle, the leading vehicle or the head vehicle. The second vehicle 14 is marked as vehicle 2 and may also be referred to as vehicle B. The second vehicle 14 may be referred to as the mid-vehicle or as trailing, following or lagging the first vehicle 12. The third vehicle 16 is the final vehicle in the convoy, is marked as vehicle 3 and may be referred to as Vehicle C or the tail vehicle. The third vehicle 16 may be referred to as trailing, following or lagging the first vehicle 12 and/or the second vehicle 14. Both the second vehicle 14 and third vehicle 16 are non-lead vehicles. The first vehicle 12 is a preceding vehicle for both the second vehicle 14 and the third vehicle 16, and the second vehicle is a preceding vehicle for the third vehicle 16. It will be understood that the lead vehicle may not be the head vehicle of the convoy, for example, the convoy shown in FIG. 1 may be a subset of larger convoy such that the first vehicle 12 is not the head vehicle of the overall convoy.

Figure 2:
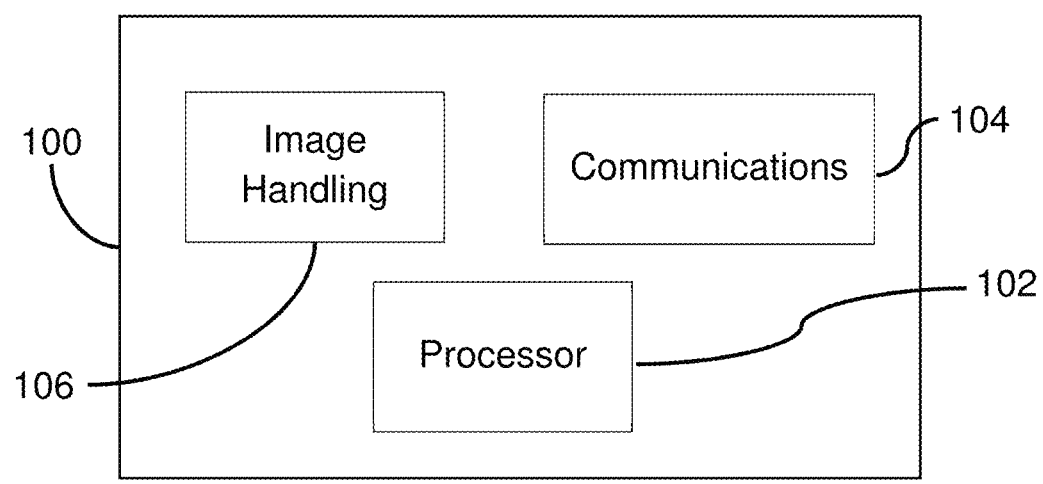
FIG. 2 shows a block diagram of a system according to an embodiment of the invention.

Referring now to FIG. 2, there is shown a block diagram of a system 100 suitable for use in a non-lead vehicle in a convoy of vehicles. The system comprises a control means in the form of a processor 102, a communications module 104 and an image handling module 106.

The image handling module 106 is adapted to obtain images of a scene in the vicinity of the non-lead vehicle, which images may be referred to as non-lead image data. The scene in the vicinity of the non-lead vehicle may be referred to as the first scene. The scene in the vicinity of a vehicle may be understood to refer to the terrain and any objects located in a field of view forward and to the sides of the vehicle, as would be captured by a camera mounted on the vehicle. The image handling module 106 may comprise a camera (not shown) for capturing the non-lead image data. Alternatively, the image handling module may be adapted to receive the non-lead image data from a camera external to the system 100. Typically, the non-lead image data is obtained from a camera installed in a region of a vehicle above or near the top of the windscreen such that the camera has sufficient height to provide a suitably large field of view in the vicinity of the vehicle. In one example arrangement, the scene in the vicinity of the vehicle is captured by a forward-facing camera, mounted near the top of the windscreen, the camera having a horizontal field of view of 48 degrees and a vertical field of view of 27 degrees. It will be understood that with a camera of such a field of view, the scene in the vicinity of the non-lead vehicle that is captured by the camera is largely ahead of the vehicle. The camera will be tilted down slightly so as to ensure that the ground in front of the vehicle is captured in the image data. The camera may be a mono camera, but in a typical arrangement may be a stereo camera. The camera may be adapted to provide the non-lead image data in a greyscale format or in a colour format such as RGB. Use of a colour camera is preferred as it allows a colour output to the user, which is more intuitive. A suitable camera may produce an image of 1024 by 544 pixels.

The communications module 104 is adapted to communicate with other vehicles in the convoy. The communications module 104 is typically adapted to communicate with the other vehicles according to the Vehicle to Vehicle (V2V) protocols so as to provide broadcast transmissions from one vehicle to all vehicles within range. Additionally or alternatively, the communications module may be adapted to provide specific vehicle to vehicle direct transmissions. The communications module 104 is adapted to receive data from at least one other vehicle in the convoy. The communications module 104 is adapted to receive data from a preceding vehicle in the convoy, which may be the lead vehicle in the convoy or simply a vehicle that is in the vicinity of the vehicle in question. The communications module may also be adapted to receive data from other vehicles in the convoy.

The processing module 102 is adapted to process data received from the image handling module 106 and the communications module 104.

In use, the image handling module 106 obtains non-lead image data of the scene in the vicinity of the non-lead vehicle. Such non-lead image data may typically include one or more preceding vehicles in the convoy, such that aspects of the terrain are obscured from view. The communications module 104 receives data from the lead vehicle in the convoy, and may receive data from some or all of the other vehicles in the convoy.

The received data includes lead image data of the scene in the vicinity of the lead vehicle. The scene in the vicinity of the lead vehicle may be referred to as the second scene. It will be understood that there may be an overlap between the first scene and the second scene. As there are no vehicles ahead of the lead vehicle, the terrain captured in the lead image data is unlikely to be obscured.

The received data may include lead pose data, i.e. pose data of the lead vehicle. The pose data comprises position data and orientation data for the vehicle with respect to the environment. The orientation data includes pitch, roll and yaw, providing information with six degrees of freedom. The pose data is derived from the lead image data. If the pose data is not received from the lead vehicle, it is calculated by the processing module 102 of the non-lead vehicle.

The processing module 102 obtains a sparse map of the scene in the vicinity of the lead vehicle derived from the lead image data. This sparse map may be sent from the lead vehicle or it may be derived by the processing module 102. The sparse map comprises coordinates of a set of identifying features in the scene, and may further include a representation of visual information surrounding each coordinate. The sparse map may take the form of a set of 3D world points. In an example, the sparse map of the lead image data is generated as part of the calculation of the pose data for the lead image. In such an example, if the pose data is received from the lead vehicle, it is convenient to also receive the sparse map from the lead vehicle. However, if the pose is calculated by the processing module 102 of the non-lead vehicle, the processing module 102 will also derive the sparse map. The processing module 102 will then derive pose data for the non-lead vehicle relative to the lead vehicle from the non-lead image data and the sparse map via visual odometry. Visual odometry is the process of determining the position and orientation of an object using sequential camera images to estimate the distance travelled.

It is possible to calculate 3D information for the sparse map using the disparity image from a stereo camera in the lead vehicle.

Once the relative pose of the non-lead vehicle to the lead vehicle has been identified, this may be displayed to the user via a display in the vehicle.

The processing module may be further adapted to generate a dense map of the scene in the vicinity of the non-lead vehicle 14. The dense map is derived in a similar manner to the sparse map, by performing feature extraction on lead image data. The points of the sparse map may be a sub-set of the points of the dense map. The dense map comprises a large set of 3D world points of the scene in the vicinity of the lead vehicle, and may comprise all or substantially all of the 3D world points in the lead image data. Each 3D world point of the dense map may comprise additional image data such as colour or greyscale data for that point. The processing module uses the relative pose information derived from the sparse map to position the non-lead vehicle in the dense map, such that the dense map may be displayed in the non-lead vehicle from the point of view of the non-lead vehicle.

To calculate the initial pose of the lead vehicle, two frames of lead image data are required, that is, to calculate the pose at time t, a frame at time t-1 and a frame from time t are required. For the non-lead vehicle, relative pose at time t may be calculated from a frame of non-lead image data at time t and the sparse map from time t.

It will be understood that relative pose can only be calculated if the frame has sufficient overlap with the visual information stored in the 3D coordinates of the sparse map.

Figure 3:
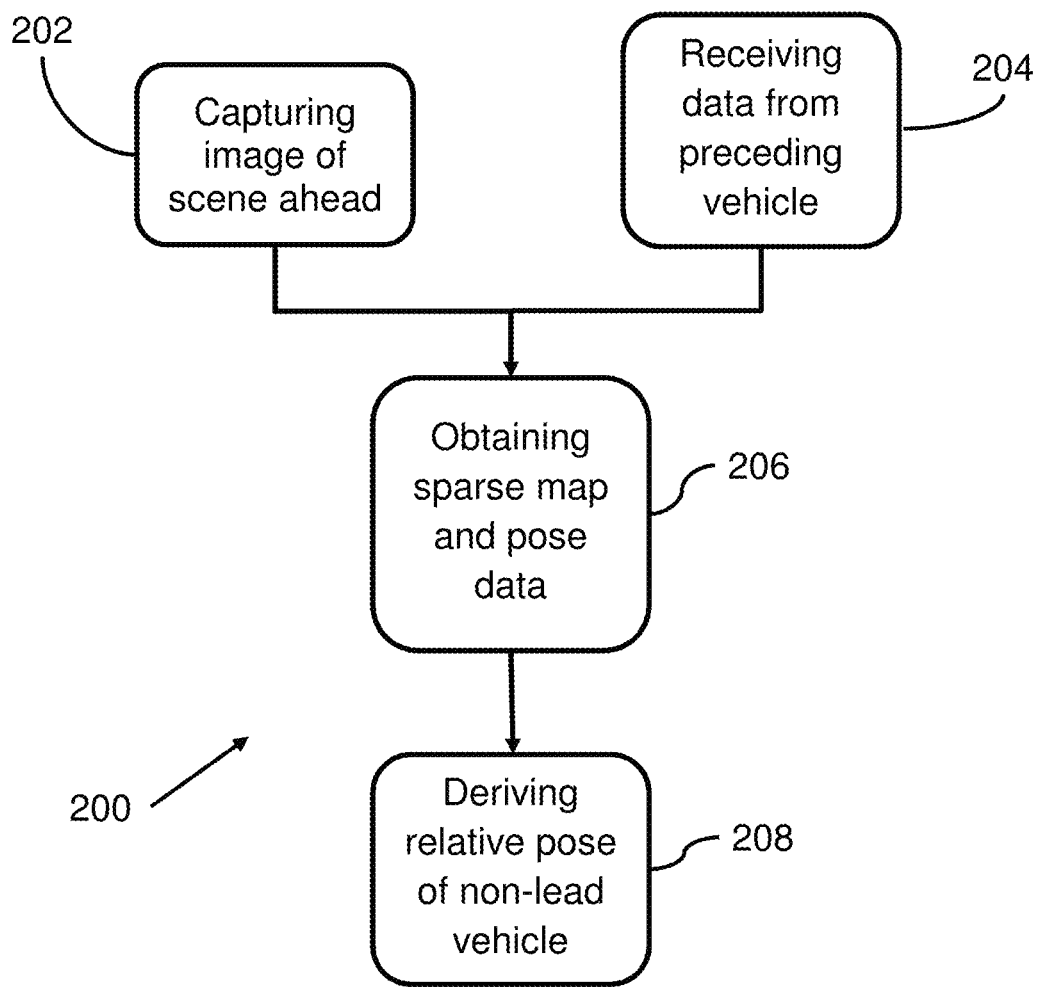
FIG. 3 shows a flow chart of a method according to an embodiment of the invention.

Referring now to FIG. 3, there is shown a flowchart of a method 200 according to an embodiment of the invention. The method is carried out in relation to non-lead vehicle in a convoy. In step 202, the method includes capturing images of the scene in the vicinity of the non-lead vehicle, the images may be referred to as non-lead image data. The images are captured by a forward-facing camera located in or on the non-lead vehicle. The camera may be a stereo camera adapted to provide left and right images and a disparity image derived therefrom. It will be understood that the disparity image may be output directly by the stereo camera or may be separately derived from the stereo images. The images may be colour images, or may be greyscale. In step 204, the non-lead vehicle receives data from the lead vehicle in the convoy. The received data includes lead image data of the scene in the vicinity of the lead vehicle. Steps 202 and 204 may take place substantially simultaneously. In step 206, the non-lead vehicle obtains pose data for the lead vehicle and a sparse map of the scene in the vicinity of the lead-vehicle. The sparse map and pose data may be obtained from the lead vehicle, which will have derived them from the lead image data. Alternatively, the non-lead vehicle may derive the pose data and sparse map from the received lead image data. In step 208, the non-lead vehicle derives the relative pose of the non-lead vehicle relative to the lead vehicle. The relative pose is derived from the non-lead image data and the sparse map via visual odometry. In order to provide information for the visual odometry, the steps of the method are repeated for successive frames of image data. Visual odometry allows the successive images to be aligned and merged so as to form a view of the route traversed. In an example arrangement, the stereo cameras may operate at a framerate of 30 fps. The frame rate may be affected by the disparity range, image colour space and resolution. In an off-road situation, where vehicles would typically not be travelling at high speed, a framerate as low as 15 fps would provide a useful output.

Figure 4:
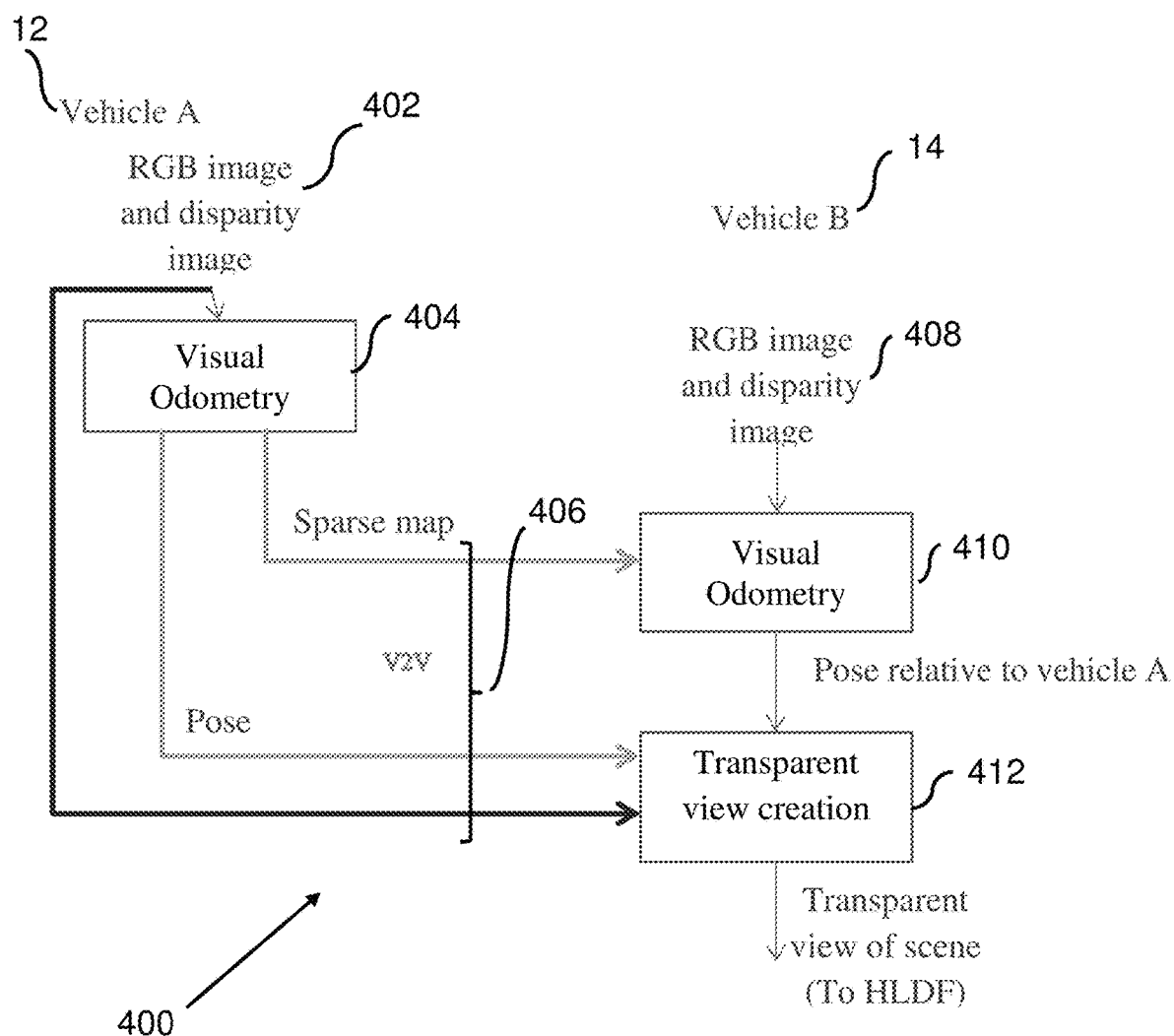
FIG. 4 shows a flowchart of a method according to an embodiment of the invention.

Referring now to FIG. 4, there is shown a flowchart of a method according to an embodiment of the invention, indicated generally by the reference numeral 400. The method illustrated in FIG. 4 provides a view to a non-lead vehicle in a convoy of the scene in the vicinity of the non-lead vehicle in which the lead vehicle in the convoy appears transparent. In step 402, Vehicle A, that is the lead vehicle 12 in a convoy, captures images of the scene in its vicinity using a stereo colour camera. The output of the camera comprises a left RGB image, a right RGB image and a greyscale disparity image. The output of the stereo colour camera may be referred to as 3D lead image data. It is not necessary to use colour data however, it is useful in providing a more informative and user-friendly output view. In step 404, the lead vehicle 12 carries out visual odometry on the 3D lead image data to derive the pose data of the lead vehicle and a sparse map of the scene in the vicinity of the lead vehicle. For these calculations, the values for certain intrinsic and extrinsic parameters of the camera are required. The visual odometry calculations require the focal length of the camera, the size of the pixels in millimetres, the orientation and position of the camera with respect to the vehicle and the angle at which the camera is mounted on the vehicle.

In order to derive the pose data, the method carries out feature extraction in the left (or right) image of the 3D lead image data. The lead vehicle's initial pose data is defined with respect to the extracted features. Each subsequent frame is analysed with respect to the same extracted features and from this analysis it is possible to detect the change in the position and orientation of the vehicle. For pose calculation, the disparity image is used in combination with one of the left or right image. For each frame, the dominant visual features present in the image are found and compared with the previous frame and the sparse map, which is created using all the previous frames. Strong visual features are identified using left (or right) image data and perspective projections. Corresponding matched points in the subsequent frames/map are used to identify the pose using trigonometric calculations. The key information from the frame will then be stored in the sparse map.

The sparse map is developed comprising the coordinates of the extracted features used in the pose data calculation. The sparse map comprises the coordinates expressed as 3D world points with a representation of visual information surrounding each coordinate. The sparse map includes 3D world points which are derived from each frame based on their uniqueness and ability to provide a compact representation of the dense map. 3D world points also include information such as pose with respect to a reference frame, image feature descriptor, normal and distance from the reference frame. Image feature descriptors are obtained by identifying dominant key points from the whole image. The key points are found by dividing the image into grids of equal size. Each grid represents a collection of image pixels. A representative vector is computed for each key point. In this way, the sparse map contains information on the terrain traversed that may be used to localise another vehicle within the scene but does not contain significant redundant information.

In step 406, the lead vehicle 12 transmits the pose data, sparse map and lead image data to the non-lead vehicle 14, via vehicle to vehicle (V2V) communication protocols.

In step 408, similar to step 402, the non-lead vehicle 14 captures images of the scene in the vicinity using a stereo colour camera. The output of the camera may comprises two of a left RGB image, a right RGB image and a greyscale disparity image. Some stereo cameras give either left or right image along with disparity information. If the disparity image is not present then the stereo cameras will give both left and right images. The images captured by the non-lead vehicle may be referred to as 3D non-lead image data. Initially, at least, the lead vehicle may be present in the scene in the vicinity of the non-lead vehicle, but this is not a requirement. The lead vehicle will have traversed the scene in the vicinity of the non-lead vehicle such that there is overlap between the lead image data and the non-lead image data. Accuracy is improved as overlap increases. While typically the non-lead vehicle and lead vehicle may have similar camera hardware, this is not a requirement.

In step 410, the non-lead vehicle carries out feature extraction on the 3D non-lead image data and then using visual odometry in comparison with the received sparse map, calculates the pose of the non-lead vehicle 14 relative to the lead vehicle 12.

In step 412, the non-lead vehicle 14 generates a 3D point cloud from the 3D image data received from the lead vehicle. Using the disparity image and the camera parameters, a 3D point can be calculated for each pixel in an image. The collection of 3D points constitute a 3D point cloud. Using the pose value of each frame, the 3D point cloud of each frame is oriented and translated with respect to the reference frame's point cloud. The new aligned point cloud is merged with the previous one to obtain a dense map of the route traversed by the lead vehicle. The 3D dense map of the route is used to provide a view of the scene in the vicinity of the non-lead vehicle. This view may be displayed on a display (not shown) within the non-lead vehicle 14, for example a High Level Display Function (HLDF) used in a vehicle's infotainment system. The view is adjusted to be shown from the point of view of the non-lead vehicle 14. The view derived from the 3D dense map comprises useful information for the user of the non-lead vehicle, for example in displaying terrain obscured by the lead-vehicle.

During the method 400, each vehicle may carry out error correction in relation to pose data with reference to vehicle odometry, for example using Kalman filtering.

For calculating the initial relative pose of the non-lead vehicle 14 with respect to the lead vehicle 12, there must be sufficient overlap between the scenes viewed by the vehicles 12, 14. After the first relative pose is estimated, even if there is insufficient overlap between viewed scenes of the vehicles, the pose data of the non-lead vehicle with respect to its initial reference can be calculated. Therefore, as the relative pose of the following vehicle's initial position with the lead vehicle is known, the current relative pose can be calculated.

This method 400 provides a non-lead vehicle travelling along an off-road surface with a 3D map of the route traversed by the vehicle in front of it. The 3D map will include information of the terrain under the vehicle in front and information on the terrain which is occluded by the lead vehicle in real time. The use of visual odometry allows the method to operate independently of any infrastructure separate to the convoy and so allows the method to function in location with limited infrastructure and where GPS information is not available.

Figure 5:
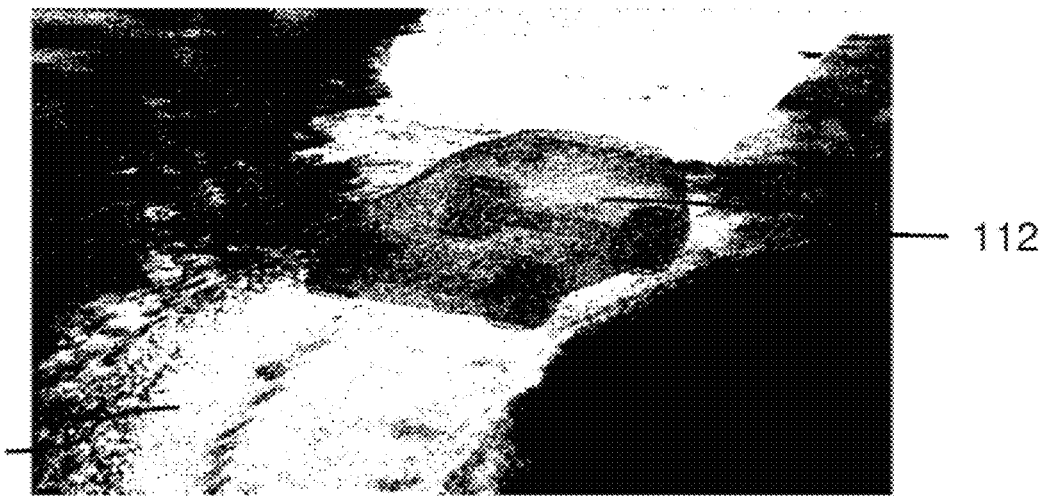
FIG. 5 shows an example of an output of a method according to an embodiment of the invention.

Referring now to FIG. 5, there is shown an example view as an output of the method 400 of FIG. 4. The view includes a dense map of an off-road track and a partially transparent indication 112 of the lead vehicle 12 as it travels along the off-road track. The user in the non-lead vehicle may choose for the indication of the vehicle not to be displayed, according to their preferences.

Figure 6A:
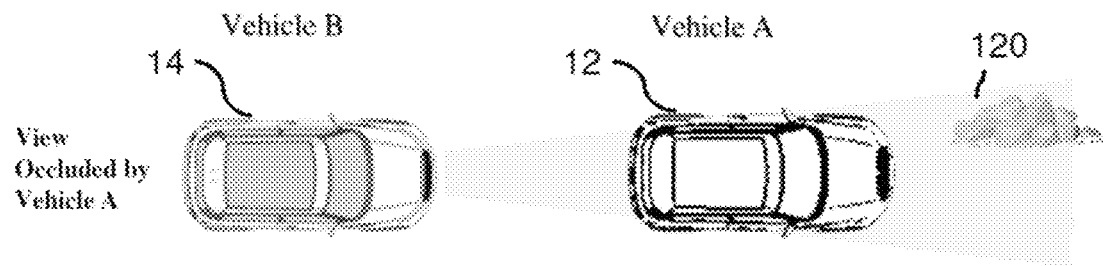
FIG. 6A shows a diagrammatic representation of a top view of two-vehicle convoy in which the method of FIG. 4 may operate.
Figure 6B:
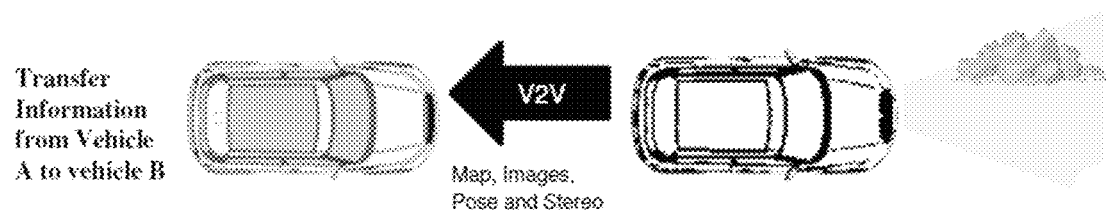
FIG. 6B shows a diagrammatic representation of the convoy at step 406 of the method of FIG. 4.
Figure 6C:
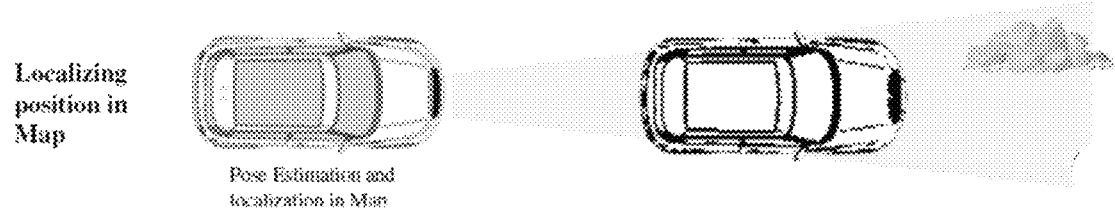
FIG. 6C shows a diagrammatic representation of the convoy at steps 408 and 410 of the method of FIG. 4.
Figure 6D:
FIG. 6D shows a diagrammatic representation of the convoy at the output of step 412 of the method of FIG. 4.

Referring now to FIGS. 6A to 6D, there is shown a diagrammatic representation of the method 400 of FIG. 4. FIG. 6A shows a top view of two-vehicle convoy of which the method of FIG. 4 may operate. The lead vehicle 12 is in front of the non-lead vehicle 14. An obstacle 120 is located in front of the lead vehicle, however the obstacle is occluded from the view from the non-lead vehicle 14 by the lead vehicle 12. As such, the users of the non-lead vehicle 14 are not aware of the presence of the obstacle 120. In FIG. 6B the lead vehicle 12 transmits data including 3D lead image data, pose data and a sparse map to the non-lead vehicle 14, corresponding to step 406 of the method 400. If FIG. 6C the non-lead vehicle 14 calculates its relative pose and location in the sparse map, corresponding to step 410 of the method 400. In FIG. 6D, the non-lead vehicle 14 has created the 3D view of the dense map resulting from step 412 of the method 400. In this way, it is shown that, because the lead vehicle 12 has been rendered transparent, the users of the non-lead vehicle 14 can see the obstacle 120 in their display. The users of the non-lead vehicle 14 can also see that there is a pothole 122 under the lead vehicle 12. The representation of the pothole 122 will have been captured by the lead vehicle 12, as part of the 3D lead image data before the lead vehicle 12 reached it.

Figure 7:
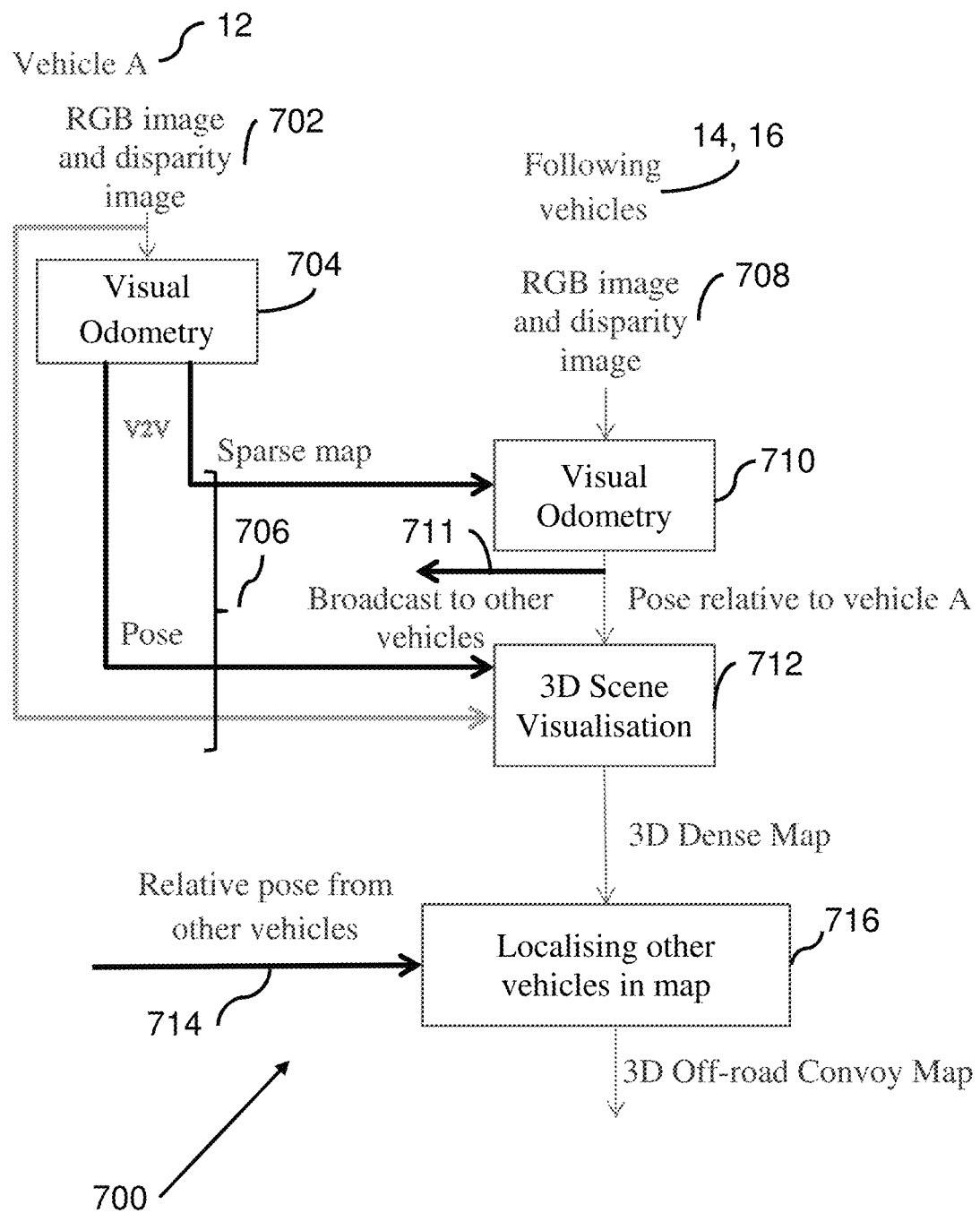
FIG. 7 shows a flowchart of a method according to an alternative embodiment of the invention.

Referring now to FIG. 7, there is shown a flowchart of a method according to an embodiment of the invention, indicated generally by the reference numeral 700. The method illustrated in FIG. 7 provides a 3D map of the route traversed by the lead vehicles to all vehicles in the convoy, with relative pose data for all vehicles in the convoy. The method illustrated in FIG. 7 is largely similar to that illustrated in FIG. 4. In step 702, Vehicle A, i.e. the lead vehicle 12 in a convoy, captures images of the scene in the vicinity using a stereo colour camera. The output of the camera may comprise two of: a left RGB image, a right RGB image and a greyscale disparity image. The output of the stereo colour camera may be referred to as 3D lead image data. It is not necessary to use colour data however, it is useful in providing a more informative and user-friendly output view. In step 704, the lead vehicle 12 carries out visual odometry on the 3D lead image data to derive the pose data of the lead vehicle 12 and a sparse map of the scene in the vicinity of the lead vehicle 12. For these calculations, the values for certain intrinsic and extrinsic parameters of the camera are required. The visual odometry calculations require the focal length of the camera, the size of the pixels in millimetres, the orientation and position of the camera with respect to the vehicle and the angle at which the camera is mounted on the vehicle.

In order to derive the pose data, the method carries out feature extraction in the left (or right) image of the 3D lead image data. The lead vehicle's initial pose data is defined with respect to the extracted features. Each subsequent frame is analysed with respect to the same extracted features and from this analysis it is possible to detect the change in the position and orientation of the vehicle. For pose calculation, the disparity image is used in combination with one of the left or right image. For each frame, the dominant visual features present in the image are found and compared with the previous frame and the sparse map, which is created using all the previous frames. Strong visual features are identified using left (or right) image data and perspective projections. Corresponding matched points in the subsequent frames/map are used to find pose using trigonometric calculations. The key information from the frame will then be stored in the sparse map.

The sparse map is developed comprising the coordinates of the extracted features used in the pose data calculation. The sparse map comprises the coordinates expressed as 3D world points with a representation of visual information surrounding each coordinate. In this way, the sparse map contains information on the terrain traversed that may be used to localise another vehicle within the scene but does not contain significant redundant information. The sparse map includes 3D world points which are derived from each frame based on their uniqueness and ability to provide a compact representation of the dense map. 3D world points also include information such as pose with respect to a reference frame, image feature descriptor, normal and distance from the reference frame. Image feature descriptors are obtained by identifying dominant key points from the whole image. The key points are found by dividing the image into grids of equal size. Each grid represents a collection of image pixels. A representative vector is computed for each key point.

In step 706, the lead vehicle 12 transmits the pose data, sparse map and lead image data to the following vehicles 14, 16 via vehicle to vehicle (V2V) communication protocols.

In step 708, similar to step 702, each following vehicle 14, 16 captures images of the scene in the vicinity using a stereo colour camera. The output of the camera comprises a left RGB image, a right RGB image and a greyscale disparity image. The images captured by the non-lead vehicles may be referred to as 3D non-lead image data. Initially, at least, the preceding vehicles will be present in the scene in the vicinity of the non-lead vehicles, however it is not a requirement. The lead vehicle will have traversed the scene in the vicinity of the non-lead vehicle such that there is overlap between the led image data and the non-lead image data. Accuracy is improved as overlap increases. While typically the non-lead vehicles and lead vehicle may have similar camera hardware, this is not a requirement.

In step 710, each following vehicle 14, 16 carries out feature extraction on the 3D non-lead image data and then using visual odometry in comparison with the received sparse map, calculates its pose relative to the lead vehicle 12. In step 711, this relative pose data is broadcast to the other vehicles in the convoy using V2V protocols.

In step 712, each non-lead vehicle 14, 16 generates a 3D point cloud from the 3D image data received from the lead vehicle 12. Using the disparity image and the camera parameters, a 3D point can be calculated for each pixel in an image. The collection of 3D points constitute a 3D point cloud. Using the pose value of each frame, the 3D point cloud of each frame is oriented and translated with respect to the reference frame's point cloud. The new aligned point cloud is merged with the previous one to obtain a dense map of the route traversed by the lead vehicle. The 3D dense map of the route is used to provide a view of the route traversed by the lead vehicle 12. The view of the route is adjusted to suit the location of the specific following vehicle. This map may be displayed on a display (not shown) within the non-lead vehicles 14, 16 for example a High Level Display Function (HLDF) used in a vehicle's infotainment system.

The view derived from the 3D dense map comprises useful information for the user of the non-lead vehicle, for example in displaying terrain obscured by the lead-vehicle.

The method 700 provides a vehicles in a convoy with 3D map information of the route travelled by the lead vehicle and the locations of other vehicles in the convoy. The use of visual odometry allows the method to operate independently of any infrastructure separate to the convoy and so allows the method to function in locations with limited or absent infrastructure and where GPS information and other technologies are not available. Having access to the route taken by the lead vehicle is useful should the preceding vehicles be out of sight. Since the map is dense, it will give a detailed information about the terrain and obstacles in the route.

Since the data provided to the display is 3D data, the user can choose the point of view of the surroundings. A number of predefined viewpoints are available such as side-view, birds-eye view, transparent view, or view from behind the vehicle.

Figure 8:
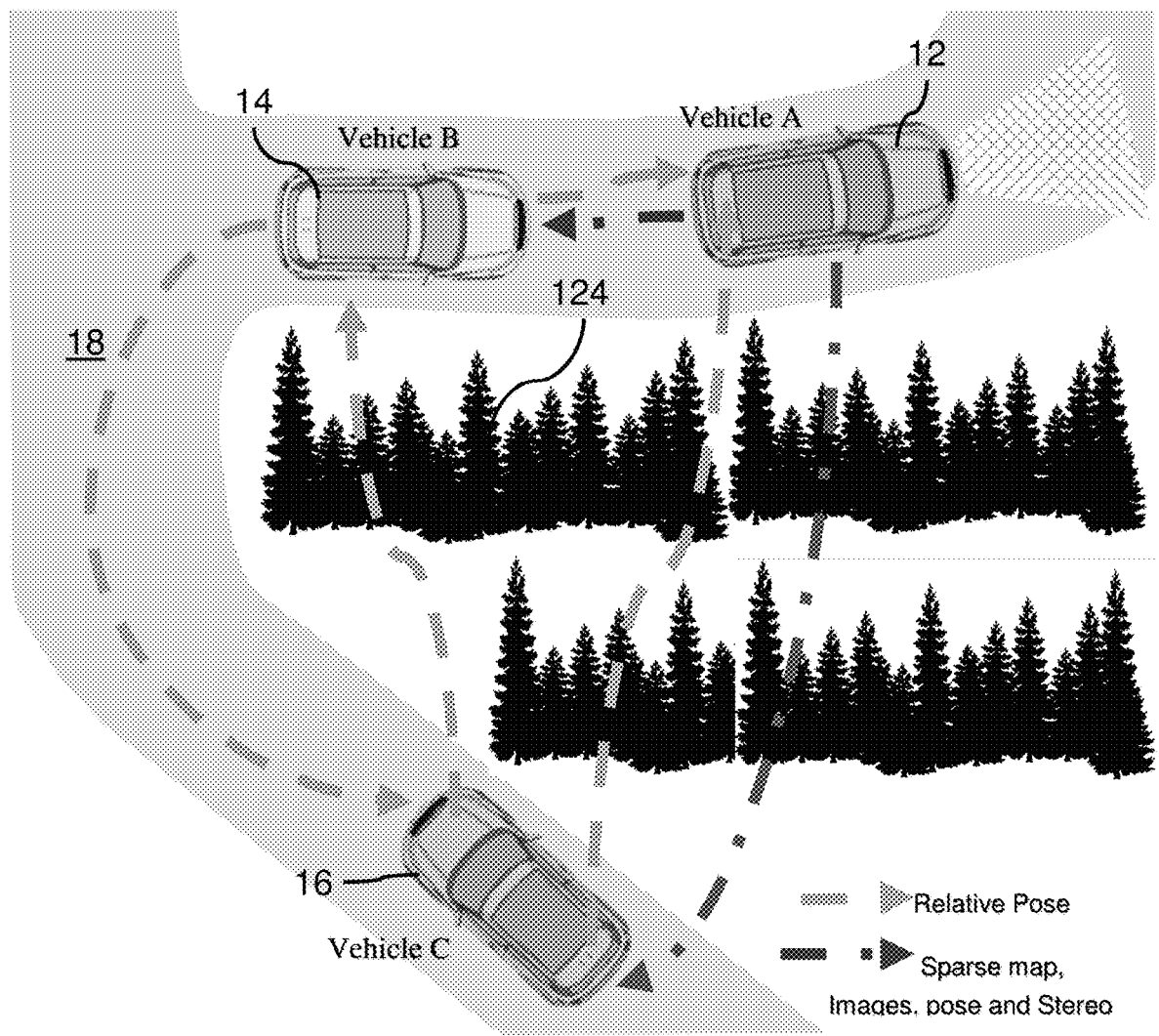
FIG. 8 shows a diagrammatic representation of a top view of three-vehicle convoy in which the method of FIG. 7 may operate.

Referring now to FIG. 8 there is shown an example of the method of FIG. 7 in use in a three vehicle off-road convoy. The off-road convoy comprises a lead vehicle 12 and two following vehicles including a second vehicle 14 and a third vehicle 16. The vehicles are travelling along a path 18. The second vehicle 14 is located approximately one car-length behind the lead vehicle 12. The lead vehicle 12 is visible to the second vehicle 14. The third vehicle 16 is a number of car lengths behind the second vehicle, and due to a bend in the path taken by the lead vehicle 12 and second vehicle 14, neither the second vehicle 14 nor the third vehicle 16 are visible to the third vehicle. An obstacle of thick trees 124 prevents the third vehicle from seeing the other vehicles. FIG. 8 also shows illustrative data paths for the data transmitted between the vehicles in the convoy, with relative pose data being marked in dashed lines and data from the lead vehicle including pose data, 3D lead image data and sparse map being marked in the dash-dot lines. Each vehicle transmits its relative pose information to each other vehicle. This allows the location of other vehicles to be shown in the convoy map. By seeing the location of the lead vehicle 12 and second vehicle 14 on the route map, the third vehicle 16 is aware of their location and also aware that they will need to turn right shortly.

The method 700 may be adapted to work as a chain, where if the third vehicle 16 is in range of the second vehicle 14, and the second vehicle 14 is in range of the lead vehicle 12 but third vehicle 16 is not in range of lead vehicle 12, the data from the lead vehicle 12 can be passed to the third vehicle 16 via second vehicle 14.

While the embodiments of FIGS. 4 to 8 make use of stereo cameras to provide data for visual odometry, it will be understood that monocular cameras and data may also be used. The use of stereo data provides for more accurate results in pose data and is also useful if providing 3D data for presenting views of the terrain to the user. Furthermore, while in the embodiments of FIGS. 4 to 8, the sparse map is generated from the lead image data by the lead vehicle, it will be understood that the non-lead vehicle may generate the sparse map from the received lead image data.

The embodiments described herein may utilise motion estimation using inter-frame key point matching.

Figure 9:
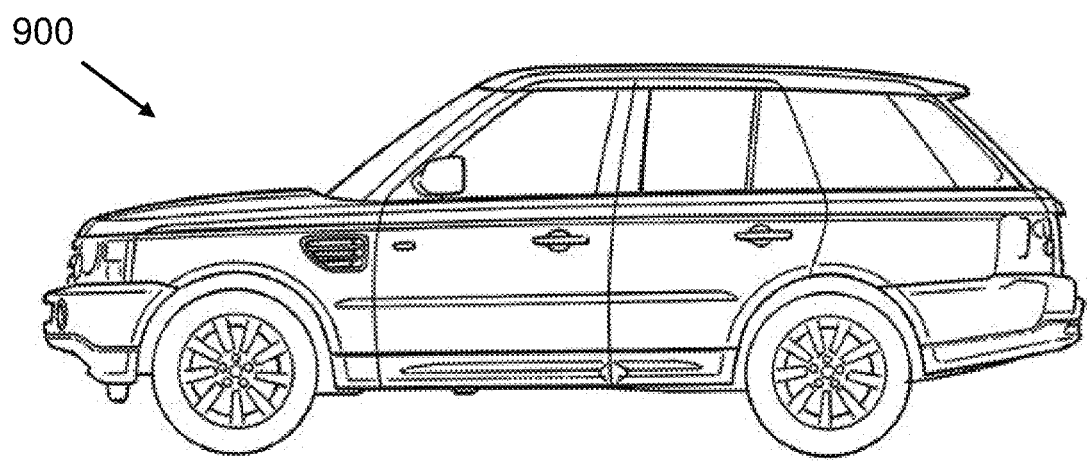
FIG. 9 shows a side view of a vehicle in which embodiments of the invention may be implemented.

Referring now to FIG. 9, there is shown a vehicle 900 in which embodiments of the invention may be implemented.

Throughout the description, when referring to a stereo camera, it will be understood that the available outputs of such a camera are typically a left image, a right image and a disparity image. The left and right images may be colour, and the disparity image is typically greyscale. If the camera does not automatically provide a disparity image, it may be calculated from the left and right images. In the present invention, for pose calculation and sparse map, if disparity information is available, there is no need for both left and right RGB images, one image will be sufficient.

The disclosure provides a system and method for tracking other vehicles in a convoy, particularly an off-road convoy. The invention uses image captured by cameras in the vehicles to identify the vehicles location relation to each other. By identifying specific features in the images, it is possible match points in images from one vehicle to points from images from another vehicle and so derive the relative location. The images may also be used to provide a view of the route travelled by the lead vehicle, to aid navigation for the following vehicles. Further the images may be used to provide a view in a following vehicle as if the preceding vehicle was not present. In this way, the following vehicle can see terrain that would be hidden by the lead vehicle. The invention is particularly suited for off-road convoys as it is implemented entirely within the vehicles and does not rely on GPS or other data signals or any infrastructure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A system suitable for use in a non-lead vehicle of a convoy, the system comprising:
   an image handling module configured to obtain non-lead image data representative of a first scene in a vicinity of the non-lead vehicle;
   a communications module configured to receive data from a preceding vehicle in the convoy, the data comprising at least lead image data of a second scene in a vicinity of the preceding vehicle; and
   a processing module configured to:
   obtain pose data of the preceding vehicle and a sparse map of the second scene, the pose data and sparse map being derived from the lead image data, wherein the sparse map comprises coordinates of a set of identifying features in the second scene, and
   derive pose data of the non-lead vehicle relative to the preceding vehicle from the non-lead image data and the sparse map via visual odometry.

2. The system as claimed in claim 1, wherein the communications module is configured to transmit the pose data of the non-lead vehicle to another vehicle in the convoy.

3. The system of claim 1, wherein the sparse map includes a representation of visual information surrounding each of the coordinates.

4. The system of claim 1, wherein the pose data of the preceding vehicle comprises position data and orientation data for the preceding vehicle with respect to the vicinity of the preceding vehicle.

5. The system of claim 1, wherein the processing module is adapted to obtain the pose data of the preceding vehicle and the sparse map from the preceding vehicle, via the communications module.

6. The system of claim 1, wherein the processing module is adapted to derive the pose data of the preceding vehicle and the sparse map from the lead image data.

7. The system of claim 1, wherein the sparse map is derived in a process of deriving the pose data of the preceding vehicle.

8. The system of claim 1, wherein the processing module is adapted to generate a terrain representation of terrain traversed by the preceding vehicle from successive frames of lead image data in combination with the preceding vehicle pose data associated with each of the frames of lead image data.

9. The system of claim 8, wherein the system comprises a display configured to display the terrain representation from a point of view of the non-lead vehicle.

10. The system of claim 9, wherein the communication module is adapted to receive relative pose data of a further vehicle in the convoy from the further vehicle.

11. The system of claim 10, wherein the display is configured to display an indication of the further vehicle according to the received pose data in the terrain representation.

12. The system of claim 11, wherein the indication of the further vehicle is such that the further vehicle appears at least partially transparent.

13. The system of claim 8, wherein the terrain representation is generated from a 3D point cloud derived from the lead image data.

14. The system of claim 1, wherein the image handling module is adapted to receive the non-lead image data from a camera mounted on the non-lead vehicle so as to capture the non-lead image data.

15. The system of claim 14, wherein the camera is a stereo camera.

16. The system of claim 1, wherein the processing module is configured to provide error correction of the pose data derived via visual odometry with vehicle odometry.

17. A vehicle comprising:
   an image handling module configured to obtain non-lead image data representative of a first scene in a vicinity of the vehicle;
   a communications module configured to receive data from a preceding vehicle in a convoy that includes the vehicle, the data comprising at least lead image data of a second scene in a vicinity of the preceding vehicle; and
   a processing module configured to:
   obtain pose data of the preceding vehicle and a sparse map of the second scene, the pose data and sparse map being derived from the lead image data, wherein the sparse map comprises coordinates of a set of identifying features in the second scene, and
   derive pose data of the vehicle relative to the preceding vehicle from the non-lead image data and the sparse map via visual odometry.

18. A method of vehicle communication in a convoy, comprising
   capturing non-lead image data of a first scene in a vicinity of a non-lead vehicle;
   receiving data from a preceding vehicle in the convoy, the data comprising at least lead image data of a second scene in a vicinity of the preceding vehicle;
   obtaining pose data of the preceding vehicle and a sparse map of the second scene, the pose data and the sparse map being derived from the lead image data, wherein the sparse map comprises coordinates of a set of identifying features in the second scene; and
   deriving pose data of the non-lead vehicle relative to the preceding vehicle from the non-lead image data and the sparse map via visual odometry.

19. A non-transitory, computer-readable storage medium storing instructions thereon that when executed by one or more processors cause the one or more processors to perform the method of claim 18.

* * * * *